US008433024B2

(12) United States Patent
Chiang et al.

(10) Patent No.: US 8,433,024 B2
(45) Date of Patent: Apr. 30, 2013

(54) SPREAD SPECTRUM CLOCK GENERATOR AND METHOD FOR ADJUSTING SPREAD AMOUNT

(75) Inventors: Chia-Tseng Chiang, Sanchong (TW); Hen-Wai Tsao, Taipei (TW)

(73) Assignee: National Taiwan University, Taipei (TW)

( * ) Notice: Subject to any disclaimer, the term of this patent is extended or adjusted under 35 U.S.C. 154(b) by 713 days.

(21) Appl. No.: 12/693,520

(22) Filed: Jan. 26, 2010

(65) Prior Publication Data

US 2011/0019718 A1 Jan. 27, 2011

(30) Foreign Application Priority Data

Jul. 27, 2009 (TW) .............................. 98125219 A

(51) Int. Cl.
*H03D 3/24* (2006.01)

(52) U.S. Cl.
USPC ........... 375/375; 375/376; 375/373; 375/371; 375/354; 375/130

(58) Field of Classification Search .................. 375/376, 375/373, 371, 354, 130
See application file for complete search history.

(56) References Cited

U.S. PATENT DOCUMENTS

2010/0127739 A1* 5/2010 Ebuchi et al. ................ 327/148
2010/0164562 A1* 7/2010 Tseng et al. .................. 327/118

* cited by examiner

*Primary Examiner* — Zewdu Kassa
(74) *Attorney, Agent, or Firm* — McClure, Qualey & Rodack, LLP

(57) ABSTRACT

A spread spectrum clock generator includes a triangular modulator, a delta sigma modulator, a frequency divider, and a phase lock loop. The triangular modulator generates a digital modulation signal, representing a decimal, according to a digital parallel signal, in which the spread amount is in proportion to the digital parallel signal. The delta sigma modulator, electrically connected to the triangular modulator, generates a divider divisor, including the decimal and an integer, according to the digital modulation signal. The frequency divider divides the frequency of the output signal clock according to the divider divisor to generate a divided clock signal, in which the frequency of the divided clock signal is substantially equal to a quotient result from dividing the frequency of the output clock signal with the divider divisor. The phase lock loop adjusts the frequency of the output clock signal according to the divided clock signal and a reference clock signal.

15 Claims, 6 Drawing Sheets

SPREAD SPECTRUM CLOCK GENERATOR AND METHOD FOR ADJUSTING SPREAD AMOUNT

RELATED APPLICATIONS

This application claims priority to Taiwan Patent Application Serial Number 98125219, filed Jul. 27, 2009, which is herein incorporated by reference.

BACKGROUND

1. Field of Invention

The present invention relates to a clock generator. More particularly, the present invention relates to a method for adjusting a spread amount of the clock generator.

2. Description of Related Art

In modern electronic devices, the transfer rate of the 10 interface, such as Serial Advanced Technology Attachment (SATA) interface, has been increased up to Gbps level. SATA is mainly used in hard disk data access, its speed has reached 6 Gbps. The maximum transmission speed of the SATAI, SATAII, SATAIII is 1.5 Gbps, 3 Gbps, and 6 Gbps, respectively.

As the SATA transfer rates increases, the Electro-Magnetic Interference (EMI), affecting or destroying the performance of peripheral electronic components, gets even worse, and the peripheral electronic components can not be used as a result. Furthermore, the clock signal generated by the clock generator is the main source causing the EMI phenomenon, so it is important to reduce the EMI phenomenon caused by the clock generator.

Presently, Spread Spectrum Clock Generator (SSCG) is commonly used to reduce the EMI phenomenon. As the name suggests, “Spread spectrum” means to spread the center frequency of the clock signal with less amount, which reduces the energy of the main frequency and disperses the reduced energy to other frequencies than the main frequency. Since the energy of the main frequency has been reduced, so the EMI phenomenon can be reduced as a result.

Spread spectrum causes the variation of the clock signal. Although the spread spectrum reduces the EMI effects, the jitter of the clock signal deteriorates, such that users often need to compromise between the clock jitter and the spread spectrum. However, the amount of the spread spectrum of the clock generator is fixed, the user can not adjust the amount of spread spectrum in accordance with the actual situation. Therefore, users can not trade-off between the amount of the spread spectrum and the clock jitter, which reduces the overall performance.

SUMMARY

According to one embodiment of the present invention, a spread spectrum clock generator, adjusting a spread amount of an output clock signal, includes a triangular modulator, a delta sigma modulator, a frequency divider, and a phase lock loop. The triangular modulator generates a digital modulation signal, representing a decimal, according to a digital parallel signal, in which the spread amount is in proportion to the digital parallel signal. The delta sigma modulator, electrically connected to the triangular modulator, generates a divider divisor according to the digital modulation signal, in which the divider divisor includes the decimal and an integer.

The frequency divider divides the frequency of the output clock signal according to the divider divisor to generate a divided clock signal, in which the frequency of the divided clock signal is substantially equal to a quotient result from dividing the frequency of the output clock signal with the divider divisor. The phase lock loop adjusts the frequency of the output clock signal according to the divided clock signal and a reference clock signal.

According to one embodiment of the present invention, a method for adjusting a spread amount applied in a spread spectrum clock generator is disclosed. The method generates a digital modulation signal representing a decimal according to a digital parallel signal, in which the digital parallel signal corresponds to the spread amount. In addition, the method generates a divider divisor which includes the decimal and an integer according to the digital modulation signal, and divides the frequency of the output clock signal according to the divider divisor to generate a divided clock signal, in which the frequency of the divided clock signal is substantially equal to a quotient result from dividing the frequency of the output clock signal with the divider divisor. Then, the method adjusts the frequency of the output clock signal according to the divided clock signal and a reference clock signal.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
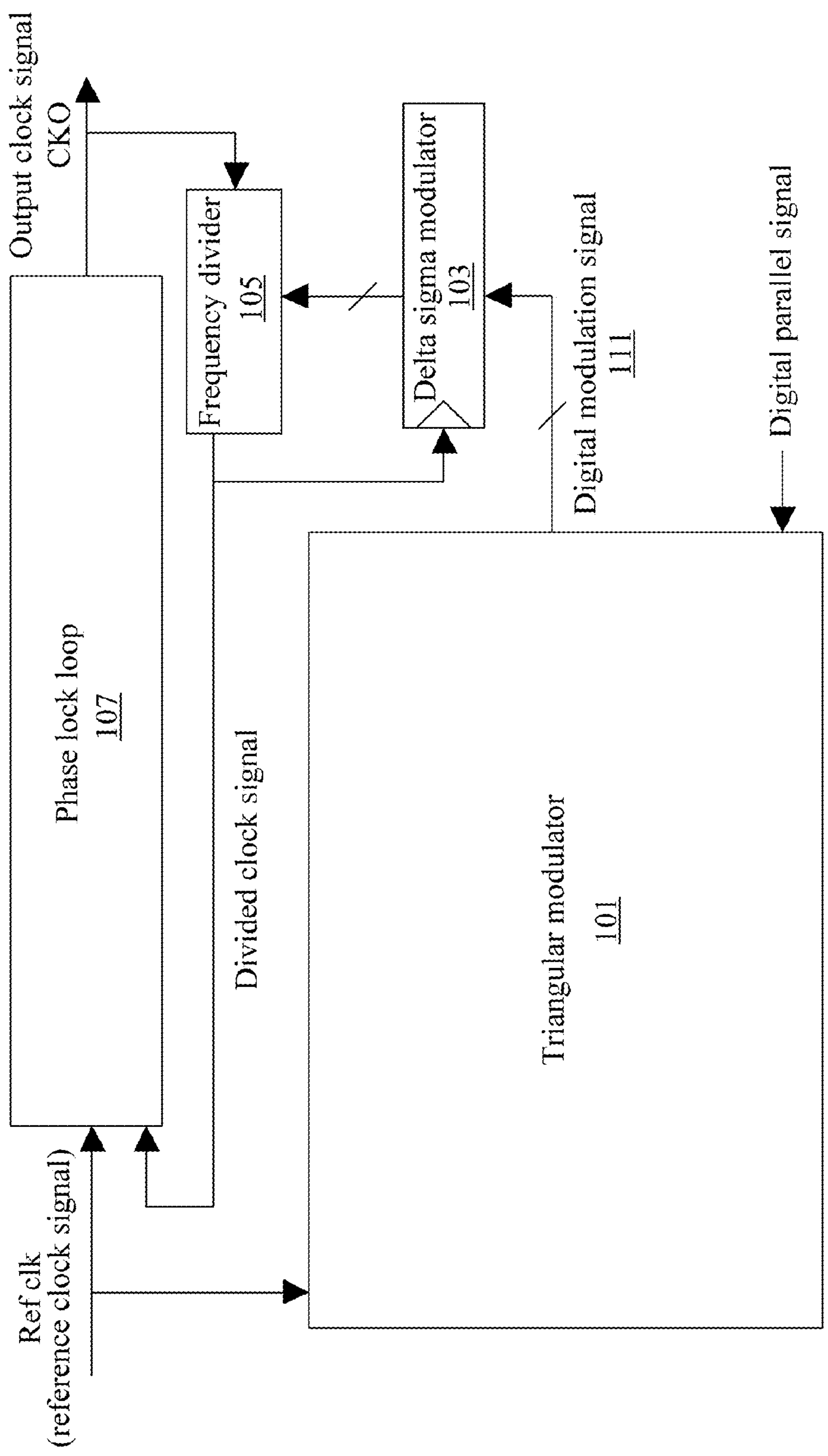
FIG. 1 shows the block diagram of the spread spectrum clock generator according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The spread spectrum clock generator as well as the method for adjusting a spread amount described in the following embodiment can adjust the spread amount of the frequency (spread spectrum) of the output clock signal in accordance with the requirement. With the adjustable spread amount, both the EMI phenomenon and the clock jitter can be taken into consideration. The clock signals are mainly generated from the phase-locked loop (Phase Lock Loop, PLL), and there are several ways to spread the spectrum or frequency of clock signals generated from the PLL: (1) modulation on the inputs; (2) modulation on the inputs of the voltage-controlled oscillator (VCO); (3) modulation on the phase of the voltage-controlled oscillator (VCO); (4) controlling the divider by the triangular integrator (Delta Sigma Modulator, DSM) for modulating. Compared with the analog modulation on the input of the voltage-controlled oscillator, modulation in the divider can be implemented with digital structure, such that the process variation can be reduced; in addition, modulation in the divider is easy to control, and the frequency modulation can be more precise. Furthermore, the modulation can be more accurate by increasing the bit number of the triangular integrator. Therefore, the following embodiment implements the modulation on the divider.

FIG. 1 shows the block diagram of the spread spectrum clock generator according to one embodiment of the present invention. The spread spectrum clock generator, adjusting a spread amount of an output clock signal, includes a triangular modulator 101, a delta sigma modulator (triangular integrator) 103, a frequency divider 105, and a phase lock loop 107. The triangular modulator 101 generates a digital modulation signal 111, representing a decimal, according to a digital parallel signal, in which the spread amount of the output clock signal is in proportion to the digital parallel signal 111. The delta sigma modulator 103, electrically connected to the triangular modulator 101, generates a divider divisor according to the digital modulation signal 111, in which the divider divisor includes the decimal and an integer. The frequency divider 105 divides the frequency of the output clock signal CKO according to the divider divisor to generate the divided clock signal, in which the frequency of the divided clock signal is substantially equal to a quotient result from dividing the frequency of the output clock signal CKO with the divider divisor. The phase lock loop 107 adjusts the frequency of the output clock signal CKO according to the divided clock signal and a reference clock signal ref clk.

In this embodiment, the digital parallel signal has ten bits, and the maximum number of the digital parallel signal or the digital modulation signal 111 is $1111111111_2$ (binary), and the spread amount is corresponding to the difference between $1111111111_2$ and the digital parallel signal. In other words, the spread amount is in proportion to the digital parallel signal, and the spread amount increases as the digital parallel signal decreases. For example, if the digital parallel signal is $1010000000_2$ ($640_{10}$) and the value difference between $1010000000_2$ and $1111111111_2$ is $0101111111_2$ ($383_{10}$), the corresponding spread amount is 0.5% of the output clock signal.

Figure 2:
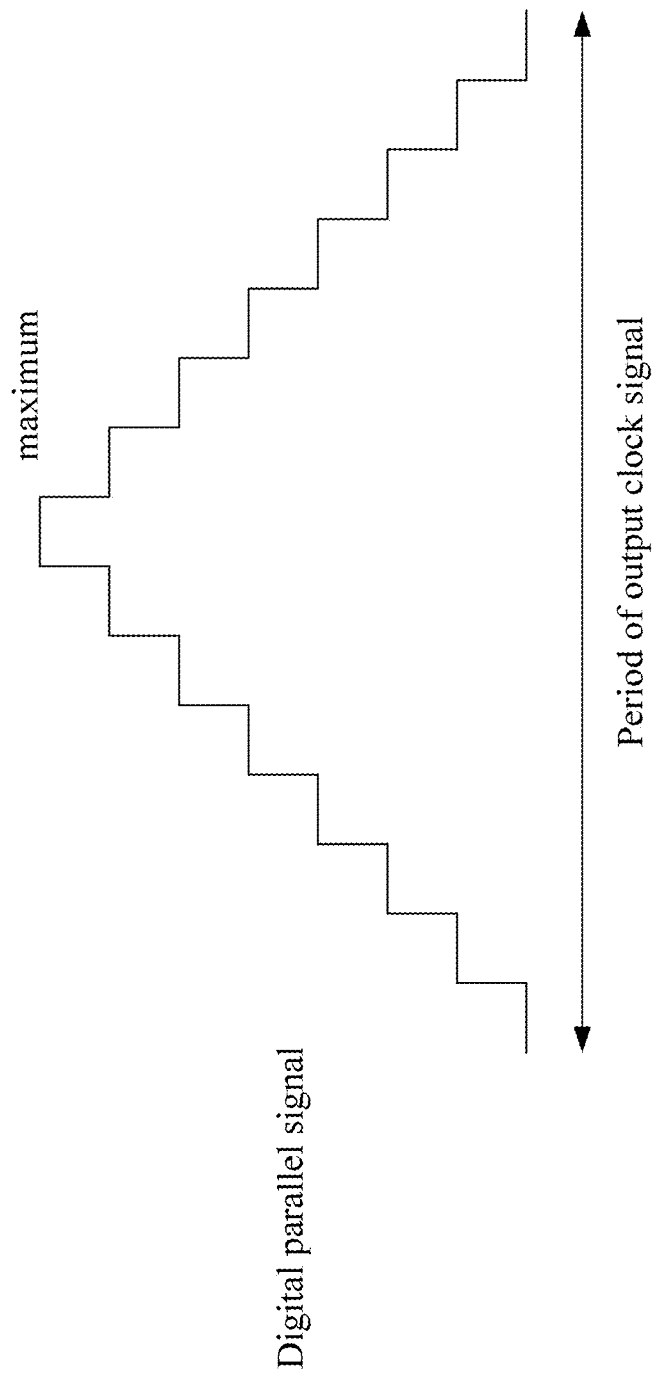
FIG. 2 shows the value of the digital modulation signal generated by the spread spectrum clock generator according to one embodiment of the present invention.

FIG. 2 shows the value of the digital modulation signal generated by the spread spectrum clock generator according to one embodiment of the present invention. The value of the digital modulation signal 111 is increased from the value of the digital parallel signal to $1111111111_2$, then decreased from $1111111111_2$ to the value of the digital parallel signal. For example, the value of the digital modulation signal 111 can be started from $1010000000_2$ ($640_{10}$) and increased to $1111111111_2$, then decreased from $1111111111_2$ back to $1010000000_2$ ($640_{10}$). The total variation time (including the increasing time and the decreasing time) of the digital modulation signal 111 is equal to the modulation period of the output clock signal.

Figure 3:
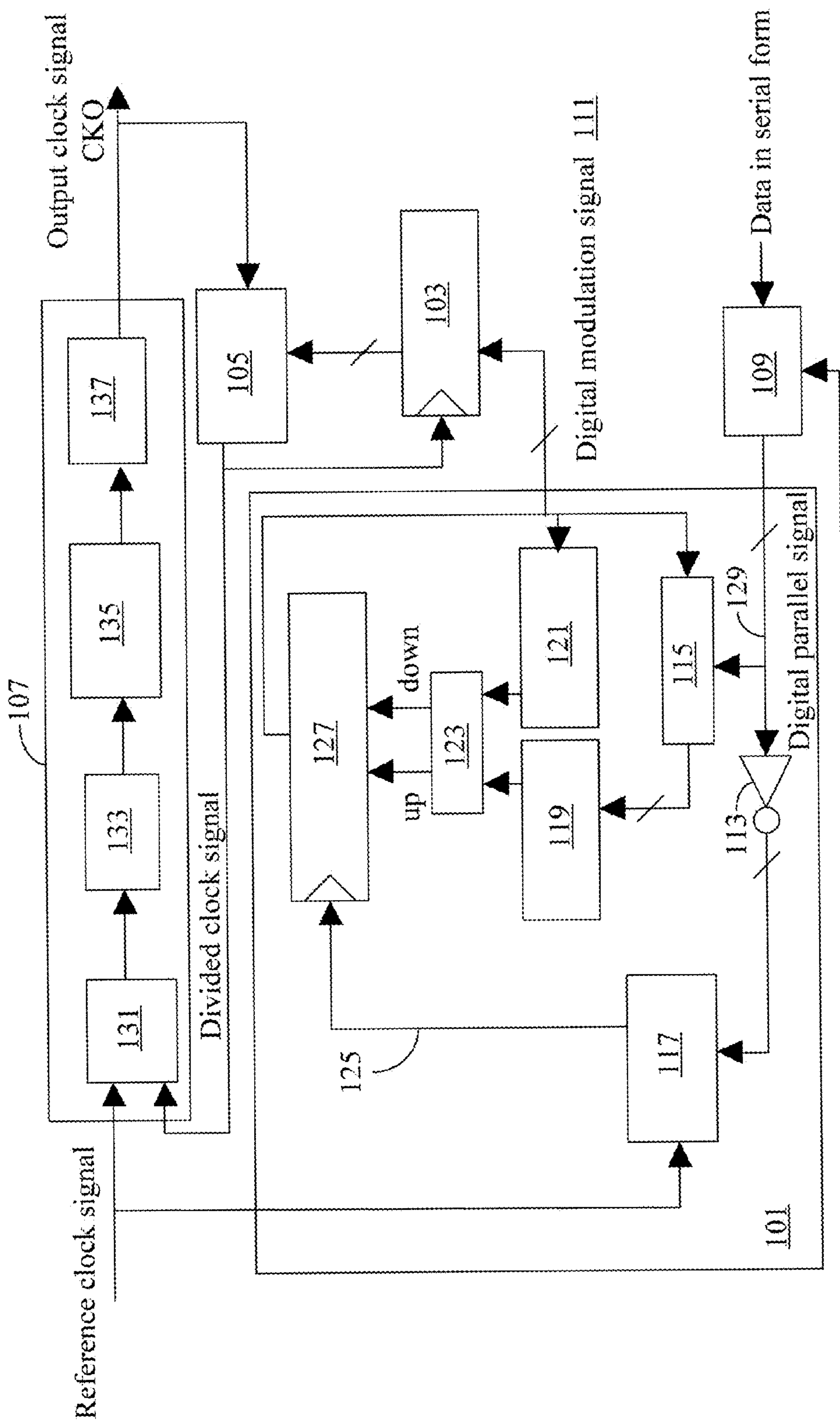
FIG. 3 shows the further block diagram of the spread spectrum clock generator according to one embodiment of the present invention.

FIG. 3 shows the further block diagram of the spread spectrum clock generator according to one embodiment of the present invention. The spread spectrum clock generator includes a triangular modulator 101, a delta sigma modulator (triangular integrator) 103, a frequency divider 105, a phase lock loop 107, and a conversion interface 109.

In the high speed system, if the signals are transmitted in parallel form, the cross talk problem and the synchronism problem are getting worse, which makes it difficult to improve the transmission speed; in addition, the number of chip pin is increased due to the parallel transmission. To solve those problems, the spread spectrum clock generator of this embodiment receives data in serial form (digital serial signal), and converts the data in serial form into the digital parallel signal by the conversion interface 109, and passes the digital parallel signal to the triangular modulator 101, in which the digital parallel signal, having the maximum value $1111111111_2$, is corresponding to the spread amount of the output clock signal CKO.

For example, if the frequency of the output clock signal is 3 GHZ and needs to be spread down 5000 ppm, the inputted digital parallel signal should be $1010000000_2$ (640) (the value difference between $1111111111_2$ and $1010000000_2$ is $0101111111_2$), and the corresponding spread amount is 0.5% of the output clock signal. If the clock signal needs to be spread down 2500 ppm (down spread 0.25%), the inputted digital parallel signal should be $1010000000_2$ (832).

The triangular modulator 101, generating a digital modulation signal 111 representing a decimal according to a digital parallel signal, includes a comparator 115, an up controller 119, a down controller 121, a latch 123, an up or down counter 127, a frequency synthesizer 117, and an inverter 113. The frequency synthesizer 117, such as an all digital synthesizer, generates an internal clock signal 125. The inverter 113 inverts the digital parallel signal and outputs the inverted digital parallel signal to the frequency synthesizer 117 to control the frequency of the internal clock signal 125 generated by the frequency synthesizer 117, in which spread amount of the output clock signal CKO corresponds to the value difference between $1111111111_2$ and digital parallel signal.

The up or down counter 127 receives the internal clock signal 125, and decreases or increases the digital modulation signal during each period of the internal clock signal 125 to make frequency divider 105 (also the delta sigma modulator 103) adjust the decimal of the divider divisor. Since the frequency of output clock signal CKO can only be tuned slightly and can not be changed substantially, therefore, the frequency of the internal clock signal 125 is in proportion to the value difference between a binary number $1111111111_2$ and the digital parallel signal to keep the frequency of the output clock signal constant approximately. The relationship between the frequencies of the internal clock, the output clock signal and the value difference is:

$2\times\alpha\times(1/\beta)=1/\gamma$, in which the $\alpha$ represents the value difference, the $\beta$ represents the frequency of the internal clock signal, and the $\gamma$ represents the frequency of the output clock signal.

Except the inverter 113, the frequency synthesizer 117, and the up or down counter 127, the triangular modulator 101 further includes a comparator 115, an up controller 119, a down controller 121, and a latch 123. The comparator 115 compares the digital parallel signal 129 and the digital modulation signal 111, and outputs a compare result. When the compare result shows that the digital modulation signal 111 is equal to the digital parallel signal, the up controller 119 outputs an up signal; on the other way, the down controller 112 outputs a down signal if the compare result shows that the digital modulation signal 111 is equal to $1111111111_2$.

The latch 123 stores and outputs the up signal and the down signal for controlling the up or down counter 127 to keep increasing or decreasing the value of the digital modulation signal 111. The up or down counter 127 increases the value of the digital modulation signal when it receives the up signal, and keeps increasing the value of the digital modulation signal until it receives the down signal until. On the other way, the up or down counter 127 keeps decreasing the value of the digital modulation signal 111 until it receives the up signal.

The delta sigma modulator 103, electrically connected to the triangular modulator 101, generates a divider divisor according to the digital modulation signal, in which the divider divisor includes the decimal and an integer. Furthermore, the up or down counter 127 outputs the decimal of the divider divisor, and the integer of the divider divisor is provided by the triangular modulator 101.

Taking SATAII for example, the frequency and the spread amount of the output clock signal is 3 GHZ and 5000 ppm, respectively, which means that the frequency of the output clock signal may be changed to 2.985 GHZ, and a frequency divider able to divide the output clock signal with a decimal is required. If the accumulator is used as the divider for dividing the output clock signal by the decimal, the quantization error occurs periodically, which induces spurs in the frequency spectrum, and IN Band phase noises is raised. Therefore, the delta sigma modulator 103 is used in this embodiment to generate the random divider divisor. In more detail, the decimal of the divider divisor varies between 0 and 1 to scatter the periodical quantization error.

The frequency divider 105 generates the divided clock signal by dividing the output clock signal CKO according to the divider divisor, and the frequency of the divided clock signal is substantially equal to a quotient result from dividing the frequency of the output clock signal with the divider divisor.

The phase lock loop 107, including a phase frequency detector 131, a charge pump 133, a low pas filter 135, and a voltage controlled oscillator 137, adjusts the frequency of the output clock signal CKO according to the divided clock signal and a reference clock signal.

The phase frequency detector 131 detects a phase difference between the divided clock signal and the reference clock signal, while the charge pump 133 adjusts a voltage controlled signal according to the detected phase difference. For example, if the detecting result represents that the phase of the divided clock signal leads the phase of the reference clock signal, the voltage value of the voltage controlled signal is decreased to synchronize the divided clock signal with the reference clock signal. The low pas filter 135 filters the voltage controlled signal to eliminate the high frequency noises, and the voltage controlled oscillator 137 generates the output the clock signal according to the filtered voltage controlled signal.

Figure 4A:
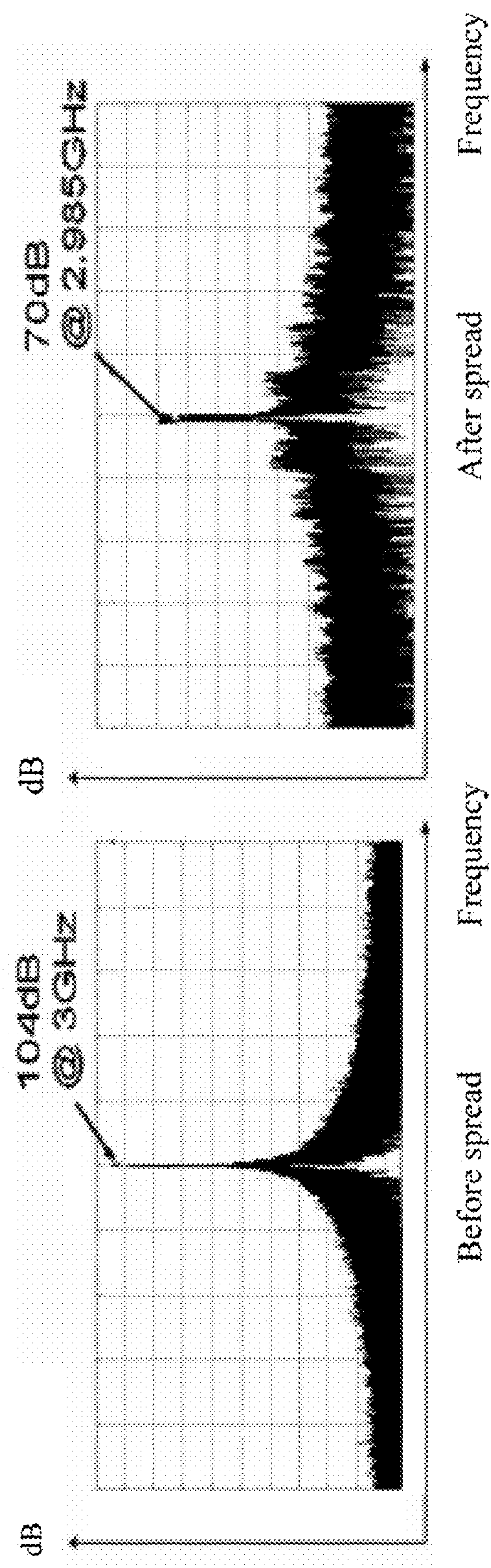
FIG. 4A shows the frequency responses of the output clock signal before and after the spectrum spreading according to one embodiment of the present invention.
Figure 4B:
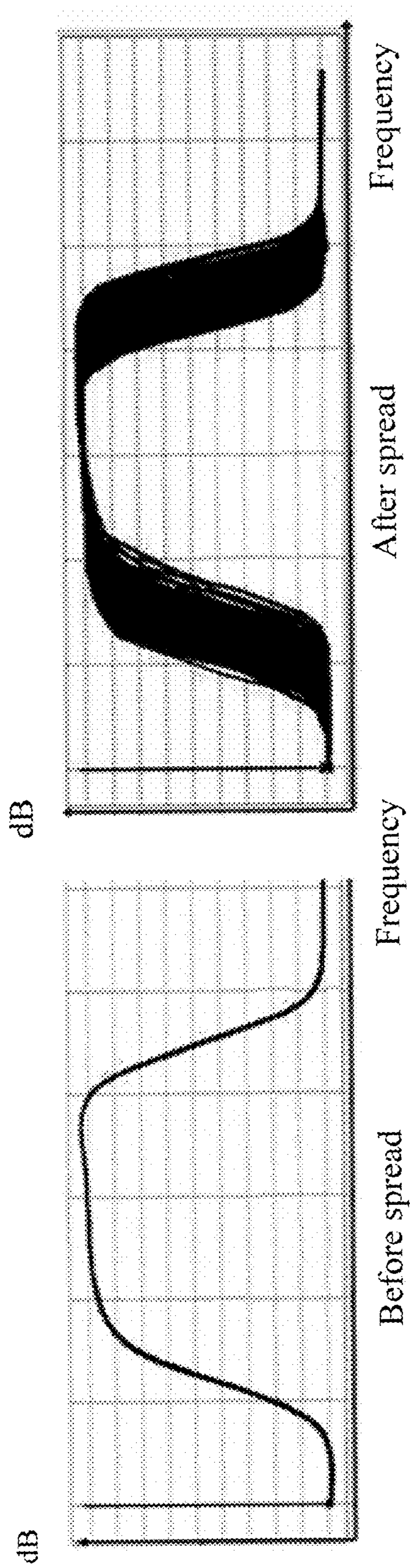
FIG. 4B shows the time responses of the output clock signal before and after the spectrum spreading according to one embodiment of the present invention.

FIG. 4A and FIG. 4B show the frequency responses and time responses of the output clock signal before and after the spectrum spreading. FIG. 4A reveals that the energy of the main frequency is decreased from 104 db to 70 db when the main frequency is spread from 3 GHZ to 2.985 GHZ, and the EMI effect can be reduced. FIG. 4B reveals that the jitter problem gets worse when the output clock signal is spread.

Figure 5:
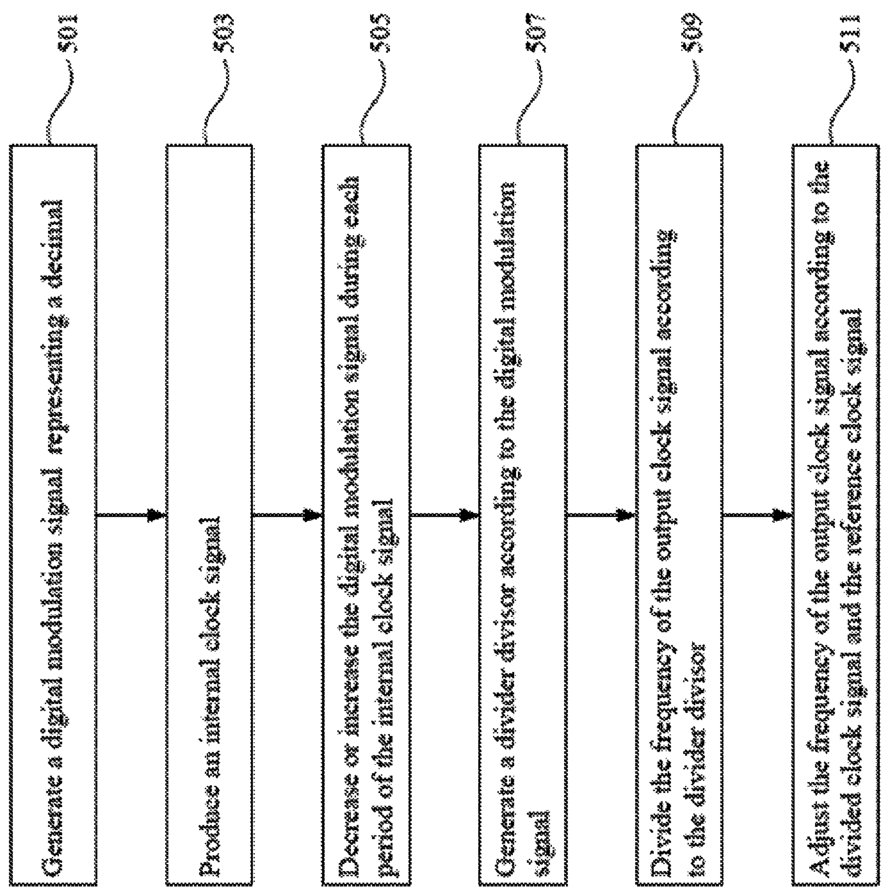
FIG. 5 shows the flowchart of the method for adjusting a spread amount applied in a spread spectrum clock generator according to one embodiment of the present invention.

FIG. 5 shows the flowchart of the method for adjusting a spread amount applied in a spread spectrum clock generator according to one embodiment of the present invention. The method generates a digital modulation signal 111 representing a decimal according to a digital parallel signal, in which the digital parallel signal corresponds to the spread amount (step 501). In addition, the internal clock signal is produced simultaneously (step 503), in which the value difference between a binary number $1111111111_2$ and the digital parallel signal relates to the frequency of the internal clock signal, such that the modulation period of the output clock signal is substantially fixed.

Next, the method decreases or increases the digital modulation signal during each period of the internal clock signal in order to adjust the decimal of the divider divisor (step 505), and generates a divider divisor which includes the decimal and an integer according to the digital modulation signal (step 507). After that, the method divides the frequency of the output clock signal according to the divider divisor to generate a divided clock signal (step 509), in which the frequency of the divided clock signal is substantially equal to a quotient result from dividing the frequency of the output clock signal with the divider divisor. Then, the method adjusts the frequency of the output clock signal according to the divided clock signal and the reference clock signal (step 511).

The clock generator of the above embodiments can maintain the frequency of the output clock signal approximately the same, while it can also adjust the spread amount of frequency of the output clock signal. Therefore, the proper spread amount conforming the specification requirement can be obtained. In addition, the EMI effect can be reduced by the adjusting the spread amount while the clock jitter has met the requirement, therefore, the users can trade off between EMI and clock jitter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A spread spectrum clock generator for adjusting a spread amount of an output clock signal, the spread spectrum clock generator comprising:

- a triangular modulator for generating a digital modulation signal, representing a decimal, according to a digital parallel signal, wherein the spread amount is in proportion to the digital parallel signal having ten bits, and the maximum value of the digital parallel signal and the digital modulation signal is $1111111111_2$;
- a delta sigma modulator, electrically connected to the triangular modulator, for generating a divider divisor according to the digital modulation signal, wherein the divider divisor including the decimal and an integer;
- a frequency divider for dividing the frequency of the output clock signal according to the divider divisor to generate a divided clock signal, wherein the frequency of the divided clock signal is substantially equal to a quotient result from dividing the frequency of the output clock signal with the divider divisor; and
- a phase lock loop for adjusting the frequency of the output clock signal according to the divided clock signal and a reference clock signal.

2. The spread spectrum clock generator as claimed in claim 1, wherein the spread amount corresponds a value difference between a binary number $1111111111_2$ and the digital parallel signal.

3. The spread spectrum clock generator as claimed in claim 2, wherein the spread amount corresponds to 0.5% of the frequency of the output clock signal when the value difference between the binary number $1111111111_2$ and the digital parallel signal $1010000000_2$ is $0101111111_2$.

4. The spread spectrum clock generator as claimed in claim 2, wherein the triangular modulator comprises:

a frequency synthesizer for generating an internal clock signal having a frequency in proportion to the value difference; and an up or down counter for decreasing or increasing the digital modulation signal during each period of the internal clock signal to adjust the decimal of the divider divisor.

5. The spread spectrum clock generator as claimed in claim 4, wherein the frequency synthesizer is an all digital frequency synthesizer.

6. The spread spectrum clock generator as claimed in claim 4, further comprising an inverter for inverting the digital parallel signal and outputting the inverted digital parallel signal to the frequency synthesizer to control the frequency of the internal clock signal.

7. The spread spectrum clock generator as claimed in claim 6, wherein the difference between the $1111111111_2$ and the inverted digital parallel signal is a synthesizer divisor of the frequency synthesizer.

8. The spread spectrum clock generator as claimed in claim 7, wherein the relationship between the frequencies of the internal clock signal, the output clock signal and the value difference is $2\times\alpha\times(1/\beta)=1/\gamma$, in which the $\alpha$ represents the value difference between a binary number $1111111111_2$ and the digital parallel signal, the $\beta$ represents the frequency of the internal clock signal, and the $\gamma$ represents the frequency of the output clock signal.

9. The spread spectrum clock generator as claimed in claim 4, wherein the triangular modulator further comprises:

a comparator for comparing the digital parallel signal and the digital modulation signal and outputting a compare result;

an up controller for outputting a up counting signal when the comparing result represents that the digital modulation signal is equal to the digital parallel signal;

a down controller for outputting a down counting signal when the comparing result represents that the digital modulation signal is equal to the $1111111111_2$; and a latch for storing and outputting the up counting signal and the down counting signal to control the up or down counter for increasing or decreasing the digital modulation signal.

10. The spread spectrum clock generator as claimed in claim 1, further comprising a conversion interface for converting a digital serial signal into the digital parallel signal.

11. The spread spectrum clock generator as claimed in claim 1, wherein the phase lock loop comprises:

a phase frequency detector for detecting a phase difference between the divided clock signal and the reference clock signal;

a charge pump for adjusting a voltage controlled signal according to the detected phase difference;

a low pas filter for filtering the voltage controlled signal; and a voltage controlled oscillator generating the output clock signal according to the filtered voltage controlled signal.

12. A method for adjusting a spread amount applied in a spread spectrum clock generator, the method comprising:

generating a digital modulation signal representing a decimal according to a digital parallel signal, wherein the digital parallel signal corresponds to the spread amount;

generating a divider divisor which includes the decimal and an integer according to the digital modulation signal;

dividing the frequency of an output clock signal according to the divider divisor to generate a divided clock signal, wherein the frequency of the divided clock signal is substantially equal to a quotient result from dividing the frequency of the output clock signal with the divider divisor;

adjusting the frequency of the output clock signal according to the divided clock signal and a reference clock signal;

generating an internal clock signal; and decreasing or increasing the digital modulation signal during each period of the internal clock signal to adjust the decimal of the divider divisor, wherein the a value difference between a binary number $1111111111_2$ and the digital parallel signal is in proportion to the frequency of the internal clock signal, such that a modulation period of the output clock signal substantially maintains the same.

13. The method for adjusting the spread amount as claimed in claim 12, further comprising converting a digital serial signal into the digital parallel signal.

14. The method for adjusting the spread amount as claimed in claim 12, wherein the digital modulation signal is increased from the digital parallel signal up to $1111111111_2$, and is decreased from $1111111111_2$ to the digital parallel signal.

15. The method for adjusting the spread amount as claimed in claim 12, wherein the relationship between the frequencies of the internal clock signal, the output clock signal, and the value difference is $2\times\alpha\times(1/\beta)=1/\gamma$, in which the $\alpha$ represents the value difference between a binary number $1111111111_2$ and the digital parallel signal, the $\beta$ represents the frequency of the internal clock signal, and the $\gamma$ represents the frequency of the output clock signal.

* * * * *